US008967372B2

(12) United States Patent
Fujii

(10) Patent No.: US 8,967,372 B2
(45) Date of Patent: Mar. 3, 2015

(54) IMAGE FORMING APPARATUS AND METHOD OF DETECTING INDEX FOR USE IN IMAGE FORMING APPARATUS

(71) Applicant: Koji Fujii, Osaka (JP)

(72) Inventor: Koji Fujii, Osaka (JP)

(73) Assignee: KYOCERA Document Solutions Inc. (JP)

( * ) Notice: Subject to any disclaimer, the term of this patent is extended or adjusted under 35 U.S.C. 154(b) by 141 days.

(21) Appl. No.: 13/666,645

(22) Filed: Nov. 1, 2012

(65) Prior Publication Data

US 2013/0112530 A1 May 9, 2013

(30) Foreign Application Priority Data

Nov. 4, 2011 (JP) ................................ 2011-242440

(51) Int. Cl.
*B65G 43/00* (2006.01)
*G03G 15/16* (2006.01)

(52) U.S. Cl.
CPC .. *G03G 15/1615* (2013.01); *G03G 2215/00156* (2013.01); *G03G 2215/0132* (2013.01)
USPC ................................ 198/810.03; 198/810.04

(58) Field of Classification Search
USPC ........................................... 198/810.03, 807
See application file for complete search history.

(56) References Cited

U.S. PATENT DOCUMENTS 7,905,346 B2 * 3/2011 Enomoto ...................... 198/807
2009/0033028 A1 * 2/2009 Yahata et al. ................ 271/259
2013/0200126 A1 * 8/2013 Kokomoto ....................... 226/1

FOREIGN PATENT DOCUMENTS

JP 06-115755 4/1994
JP 2011-123382 A 6/2011

* cited by examiner

*Primary Examiner* — Gene Crawford
*Assistant Examiner* — Lester Rushin
(74) *Attorney, Agent, or Firm* — McDonnell Boehnen Hulbert & Berghoff LLP

(57) ABSTRACT

An image forming apparatus includes a belt, a detector, a determining section, a skew correcting section, and a storage section. The belt is stretched around rollers and provided with an index. The detector provides an output value. The determining section determines the index that is passing through the detection region on the basis of a change in the output value, the change exceeding a threshold. The skew correcting section performs control relating to skew correction of inclining the roller and correcting the position of the belt. The storage section stores the threshold having a value between the measured maximum amount of change in the output value when the skew correcting section inclines the roller at the maximum angle and the amount of change in the output value resulting from the index when the index arrives at or passes through the detector.

20 Claims, 12 Drawing Sheets

IMAGE FORMING APPARATUS AND METHOD OF DETECTING INDEX FOR USE IN IMAGE FORMING APPARATUS

REFERENCE TO RELATED APPLICATIONS

This application is based upon and claims the benefit of priority from the corresponding Japanese Patent Application No. 2011-242440, filed on Nov. 4, 2011, the entire contents of which are incorporated herein by reference.

FIELD

The present disclosure relates to an image forming apparatus, such as a printer, multi-functional peripheral, copier, or facsimile machine, that uses a stretched belt.

BACKGROUND

Some image forming apparatuses use an endless belt to print an image on a sheet. There are also some image forming apparatuses that form toner images with different colors on a plurality of respective image bearing members and transfer the images on a sheet to print a color image on the sheet. Such a system is sometimes called tandem printing. Because such image forming apparatuses overlay toner images with different colors to transfer them on a sheet, they may use an endless belt as an intermediate transfer belt or a sheet transport belt. The belt is typically stretched around a plurality of rollers to be rotated. Unfortunately, the belt may suffer from skew resulting from factors such as the accuracy of manufacturing and mounting of the rollers, deviation of the axis of each roller from parallelism, nonuniformity in the thickness of the inner wall of the belt, or nonuniformity in the tension of the belt. If the skew of the belt is large, it may affect formation and transfer of a toner image. If the skew of the belt is large and the belt is too far to one side, the belt may be broken.

An image forming apparatus capable of determining the amount (degree) of skew of a belt has been proposed. The image forming apparatus includes a belt that conveys a sheet and detection means for detecting the position of a mark on the belt for use in determining the position in the belt width direction. In this image forming apparatus, the position of the belt in an initial state before the belt is driven is detected by the detection means detecting the mark, the detected position is stored, the position of the mark after a pass of a predetermined amount of the belt is detected by the detection means, and the detected position is stored. Then, the amount of skew of the belt is calculated using the difference between the position of the mark in the initial state and its position after the pass. With such a configuration, the initial speed of skewing (speed of skewing when the belt starts skewing) is detected.

To determine the state of skew of the belt, it is necessary to determine the position of the belt (position of the end of the belt) in the width direction (axial direction of the rollers). Thus, the image forming apparatus may include a detector for detecting the position of the edge of the belt. An output value (reference output value) of the detector when the belt is in a reference position (ideal position) in the axial direction of the rollers (reference output value) is determined in advance. If there is a difference between a current output value and the reference output value, the belt can be identified as being displaced from the reference position; if the difference between the output values varies, the belt can be identified as skewing.

To detect the position of the belt in the circumferential direction and measure the time required for the belt to make a single rotation, the belt may be provided with an index that projects from the edge of the belt. The position of the belt in the circumferential direction may be determined by detection of the index. The detection of the index enables optimizing the timing of forming an image, the timing of conveying a sheet, and other timings.

The position of the edge of the belt and the index may be detected by the use of an output value of a single detector (sensor). In other words, the position of the belt (amount of a skew) and the arrival or passage of the index may be detected by the use of a single sensor. However, because the index projects from the edge of the belt, if control relating to skew correction is performed on the basis of a variation in the output value of the sensor caused by an arrival or a passage of the index, then the control relating to skew correction in which the position of (the edge of) the index is viewed as the edge of the belt is performed. Thus, the skew correction may be larger than required, and the belt may further skew.

When the position of the edge of the belt and the arrival and passage of the index are detected by a single sensor, a threshold for the amount of change in the output value of the sensor is set to prevent incorrect skew correction and accurately determine the time of the arrival of the index and the time of the passage of the index. The control relating to skew correction (skew feedback control) is performed during the time the belt is driven. However, if the amount of change in the output value of the sensor is larger than the threshold, the image forming apparatus determines the passage or arrival of the index and stops the control relating to skew correction. If the amount of change in the output value of the sensor does not exceed the threshold, the image forming apparatus determines that the change in output value results from the skew of the belt and performs the control relating to skew correction.

However, the instantaneous maximum amount of the skew of the belt (maximum speed of the belt moving in the axial direction of the rollers) differs in accordance with the assembly accuracy and the precision of the members and varies from one apparatus to another. Some individual apparatuses (image forming apparatuses) include a belt that easily skews and have a large amount of change in the output value of a sensor during skewing. Other individual apparatuses include a belt that does not easily skew and have a small amount of change in the output value during skewing. There are also variations in the output characteristics among sensors. Accordingly, when the threshold of detection of the index is a value common to the model of an image forming apparatus (uniform threshold), a change in the output value of the sensor caused by the skew of the belt may be incorrectly detected as an arrival or a passage of the index. If incorrect detection relating to the index occurs, an error (imperfection) may occur in the timing of image formation or in the conveyance of a sheet. That may cause inconveniences, such as additional consumption of toner and sheets and necessity of tasks and operations for eliminating incorrect image formation and sheet conveyance.

In the above-described image forming apparatus, by detecting a formed toner image with the detection means, the amount of skew is detected. For detecting the position of the belt in the circumferential direction, the belt includes a belt hole, and a passage of the belt hole is detected by a home position sensor. That is, two items are detected by two sensors. Accordingly, even with the above-described image forming apparatus, when it detects the position of the edge of the belt and the position of the belt in the circumferential direction (index) with a single sensor, a problem remains unsolved that a change in the output value of the sensor caused by skew of the belt is incorrectly detected as an arrival or a passage of the index.

SUMMARY

An image forming apparatus according to an aspect of the present disclosure includes an endless belt, a detector, a determining section, a skew correcting section, and a storage section. The endless belt is stretched and rotated around a plurality of rollers and provided with an index projecting from an edge of the belt. The detector is arranged so as to allow the edge of the belt and the index to pass through a detection region of the detector. An output value of the detector varies depending on a length of the detection region covered by the belt or the index. The determining section determines a magnitude of the output value of the detector and a position of the edge of the belt on the basis of the magnitude of the output value. The determining section also determines that the index is passing through the detection region of the detector on the basis of a change in the output value, the change exceeding a predetermined threshold. The skew correcting section inclines at least one roller of the plurality of rollers to correct a position of the belt on the basis of the determined position of the edge of the belt. The storage section stores the threshold having a value between a measured amount of change and an amount of change resulting from the index. The measured amount of change corresponds to a maximum amount of change in the output value when the skew correcting section inclines the roller to a maximum angle to which the roller can be inclined. The amount of change resulting from the index corresponds to an amount of change in the output value when the index arrives at the detector or when the index passes through the detector.

In a method of detecting an index according to another aspect of the present disclosure, an endless belt stretched around a plurality of rollers and provided with an index projecting from an edge of the belt is rotated, and a magnitude of an output value of a detector is determined. The detector is arranged so as to allow the edge of the belt and the index to pass through a detection region of the detector. The output value varies depending upon a length of the detection region covered by the belt or the index. A position of the edge of the belt is determined on the basis of the magnitude of the output value. Detection of the index by the detector is determined on the basis of a change in the output value, the change exceeding a predetermined threshold. Control of the skew correction, inclining at least one roller of the plurality of rollers to correct the position of the belt, is performed on the basis of the determined position of the edge of the belt. The threshold is set at a value between a measured amount of change and an amount of change resulting from the index. The measured amount of change corresponds to a maximum amount of change in the output value when the roller is inclined to a maximum angle to which the roller can be inclined. The amount of change resulting from the index corresponds to an amount of change in the output value when the index arrives at the detector or when the index passes through the detector.

DETAILED DESCRIPTION OF EMBODIMENTS

Embodiments of the present disclosure are described below with reference to FIGS. 1 to 12. In the present description, a tandem printer 100 capable of color printing (corresponding to an image forming apparatus) is illustrated as an example, and an intermediate transfer belt 6 is described as an example of an endless belt. Elements such as configurations and arrangements described in the embodiments do not intend to limit the scope of the disclosure and are merely examples in the description. For example, the present disclosure is also applicable to other types of image forming apparatuses, including a multi-functional peripheral, copier, or facsimile machine, that include a belt. Further, the present disclosure is also applicable to not only a belt for use in intermediate transfer, but also a belt for conveying sheets.

Schematic Configuration of Image Forming Apparatus

Figure 1:
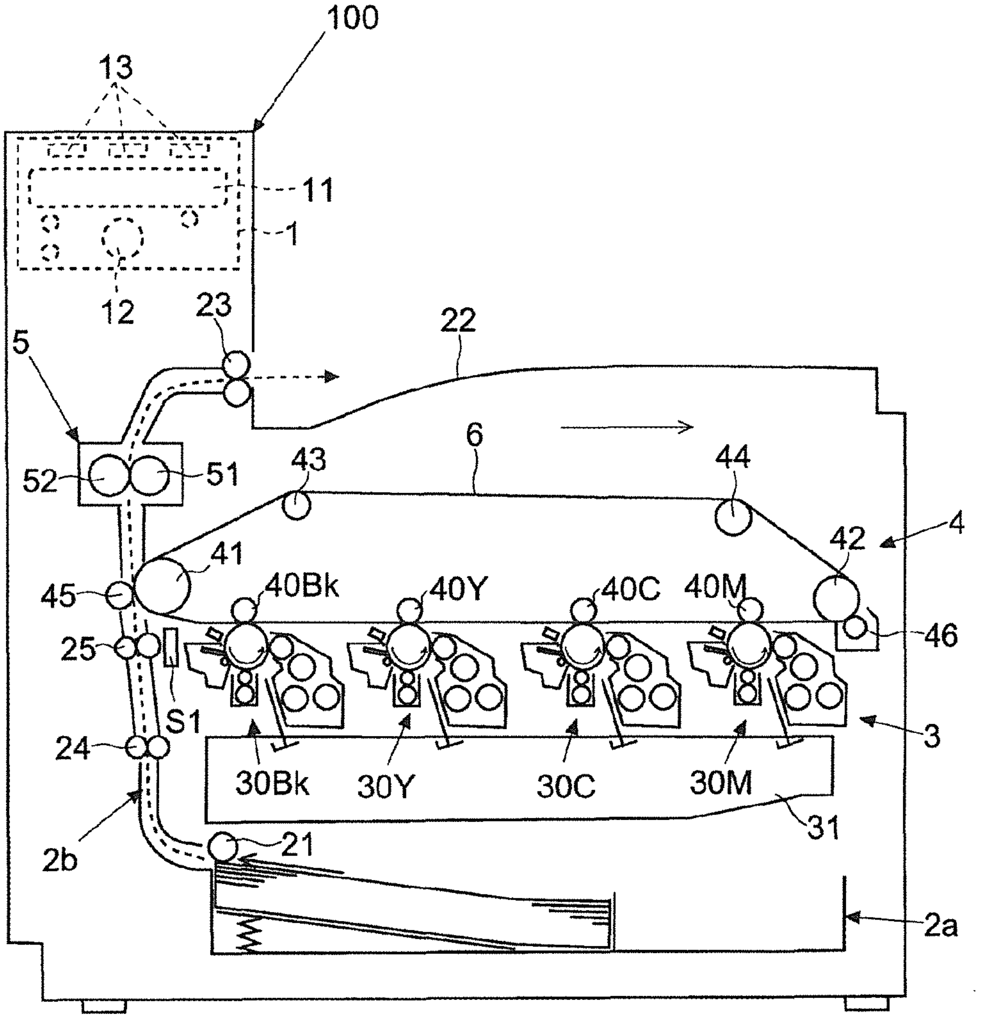
FIG. 1 is a cross-sectional view that illustrates the configuration of a printer.
Figure 2:
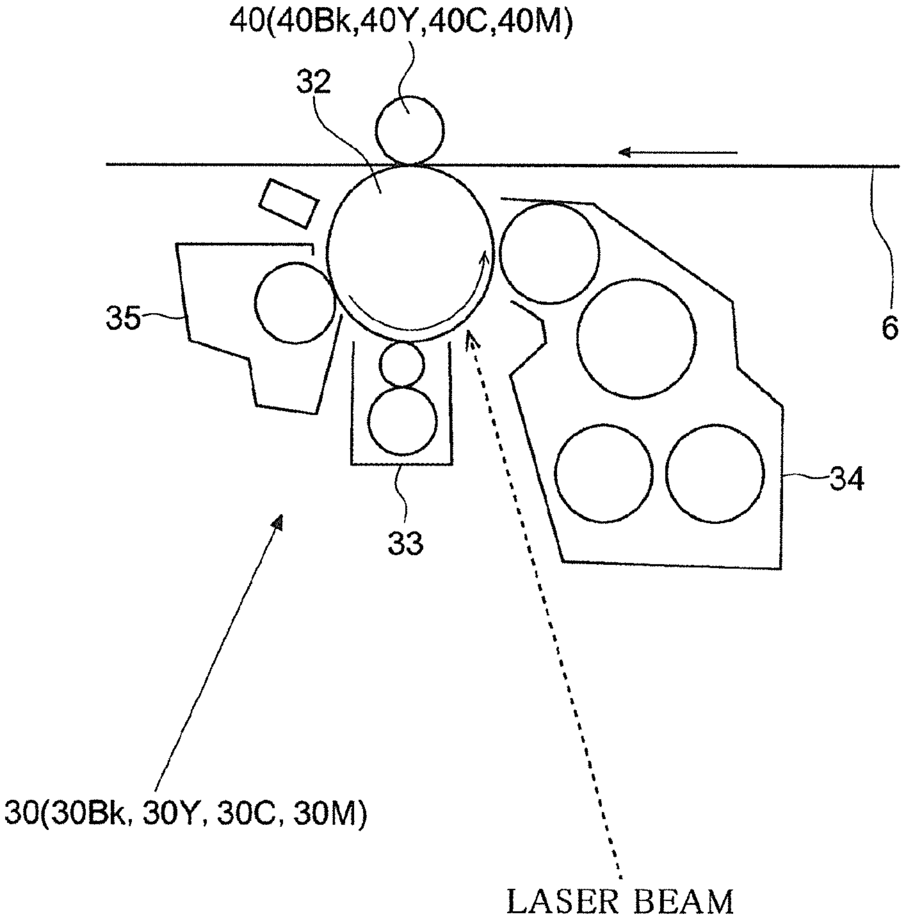
FIG. 2 is a cross-sectional view of an image forming unit.

First, the printer 100 according to an embodiment of the present disclosure is described with reference to FIGS. 1 and 2. FIG. 1 is a cross-sectional view that illustrates the configuration of the printer 100. FIG. 2 is a cross-sectional view of one of the image forming units 30.

As illustrated in FIG. 1, the printer 100 includes an operation panel 1 (corresponding to an operating section), a paper feed section 2*a*, a sheet conveying section 2*b*, an image forming section 3, an intermediate transfer section 4, and a fixing section 5.

As indicated by the broken lines illustrated in FIG. 1, the operation panel 1 is in the upper front portion of the printer 100. The operation panel 1 includes a liquid crystal display section 11 that displays the states and various messages of the printer 100. The operation panel 1 further includes keys 12 for use in setting various functions of the printer 100 and indicators 13 that is turned on or off in response to a state (e.g., the state in which a job is being executed or the occurrence of an error) of the printer 100.

The paper feed section 2*a* accommodates various types of sheets, including copy paper, transparency paper, and label paper. The paper feed section 2*a* includes a paper feed roller 21 rotated by a driving mechanism (not illustrated), such as a motor. The paper feed roller 21 by its rotation feeds a sheet to the sheet conveying section 2*b*.

The sheet conveying section 2*b* conveys a sheet in the printer 100 and guides the sheet supplied from the paper feed section 2*a* to an ejection tray 22 through the intermediate transfer section 4 and the fixing section 5. The sheet conveying section 2*b* includes pairs of conveying rollers 23 and 24 that convey a sheet and a pair of registration rollers 25 that interrupts the conveyance of a sheet into the intermediate transfer section 4 and feeds the sheet at the appropriate time.

As illustrated in FIGS. 1 and 2, the printer 100 includes the image forming section 3 that forms a toner image based on image data of an image to be formed. The image forming section 3 includes the image forming units 30 corresponding to four colors and an exposure device 31. Specifically, the image forming units 30 of the printer 100 include an image forming unit 30Bk that forms a black image, an image forming unit 30Y that forms a yellow image, an image forming unit 30C that forms a cyan image, and an image forming unit 30M that forms a magenta image.

The image forming units 30Bk to 30M are described with reference to FIG. 2. The image forming units 30Bk to 30M merely differ in that they form toner images having different colors, but have substantially the same basic configuration. In the following description, the letters Bk, Y, C, and M of the image forming units 30 are omitted unless they need to be specifically described.

Each of the image forming units 30 includes a photosensitive drum 32 (corresponding to an image bearing member) can bear a toner image on its circumferential surface. The photosensitive drum 32 includes a photosensitive layer on the outer circumferential surface, and is driven so as to be rotated at a predetermined process speed by a driving device (not illustrated). The photosensitive drum 32 is charged with a certain potential by a charging device 33. The exposure device 31 is arranged in the lower portion of the image forming section 3. The exposure device 31 converts each input image signal subjected to color separation into an optical signal, outputs a laser beam (indicated by the broken line) that is the converted optical signal, and scans and exposes the charged photosensitive drum 32. This forms an electrostatic latent image on the surface of the photosensitive drum 32. A developing device 34 stores a developer of a corresponding color. The developing device 34 supplies toner to the electrostatic latent image formed on the photosensitive drum 32 and develops the electrostatic latent image as a toner image. A cleaning device 35 cleans the photosensitive drum 32.

Referring back to FIG. 1, in response to a primary transfer of the toner image from the photosensitive drum 32, the intermediate transfer section 4 secondarily transfers the toner image to a sheet. The intermediate transfer section 4 includes primary transfer rollers 40Bk to 40M, a driving roller 41, a driven roller 42, and tension rollers 43 and 44, around which the intermediate transfer belt 6 is stretched, and the intermediate transfer belt 6. The intermediate transfer section 4 further includes a secondary transfer roller 45 and a belt cleaning device 46. The intermediate transfer belt 6 is sandwiched between the primary transfer rollers 40Bk to 40M and the respective photosensitive drums 32. A transfer voltage (primary transfer bias) is applied to each of the primary transfer rollers 40Bk to 40M, and the toner image formed on each of the photosensitive drums 32 is primarily transferred to the intermediate transfer belt 6.

The driving roller 41 is connected to a driving mechanism, such as an intermediate transfer motor 47 (see FIG. 3) and gears, and is driven so as to be rotated. The rotation of the driving roller 41 rotates the intermediate transfer belt 6. The intermediate transfer belt 6 can be made of, for example, a dielectric resin. The intermediate transfer belt 6 is sandwiched between the driving roller 41 and the secondary transfer roller 45. Toner images (of black, yellow, cyan, and magenta) formed by the image forming units 30 are superposed in sequence without misregistration and primarily transferred to the intermediate transfer belt 6. The pair of registration rollers 25 feeds a sheet to the nip between the secondary transfer roller 45 and the intermediate transfer belt 6 so as to match with the time when the primarily transferred toner image arrives at the nip. A predetermined voltage for use in a secondary transfer is applied to the secondary transfer roller 45. As a result, the toner image is secondarily transferred to the sheet.

The fixing section 5 is arranged downstream from the secondary transfer roller 45 in the direction in which sheets are conveyed. The fixing section 5 heats and presses the toner image secondarily transferred to the sheet to fix it thereon. The fixing section 5 mainly includes a fixing roller 51 incorporating a heating source and a pressing roller 52 pressed in contact with the fixing roller 51. The sheet with the transferred toner image is heated and pressed while passing through the nip between the fixing roller 51 and the pressing roller 52. As a result, the toner image is fixed on the sheet. The sheet after the fixation is ejected to the ejection tray 22, and the image formation is completed.

Hardware Configuration of Printer 100

Figure 3:
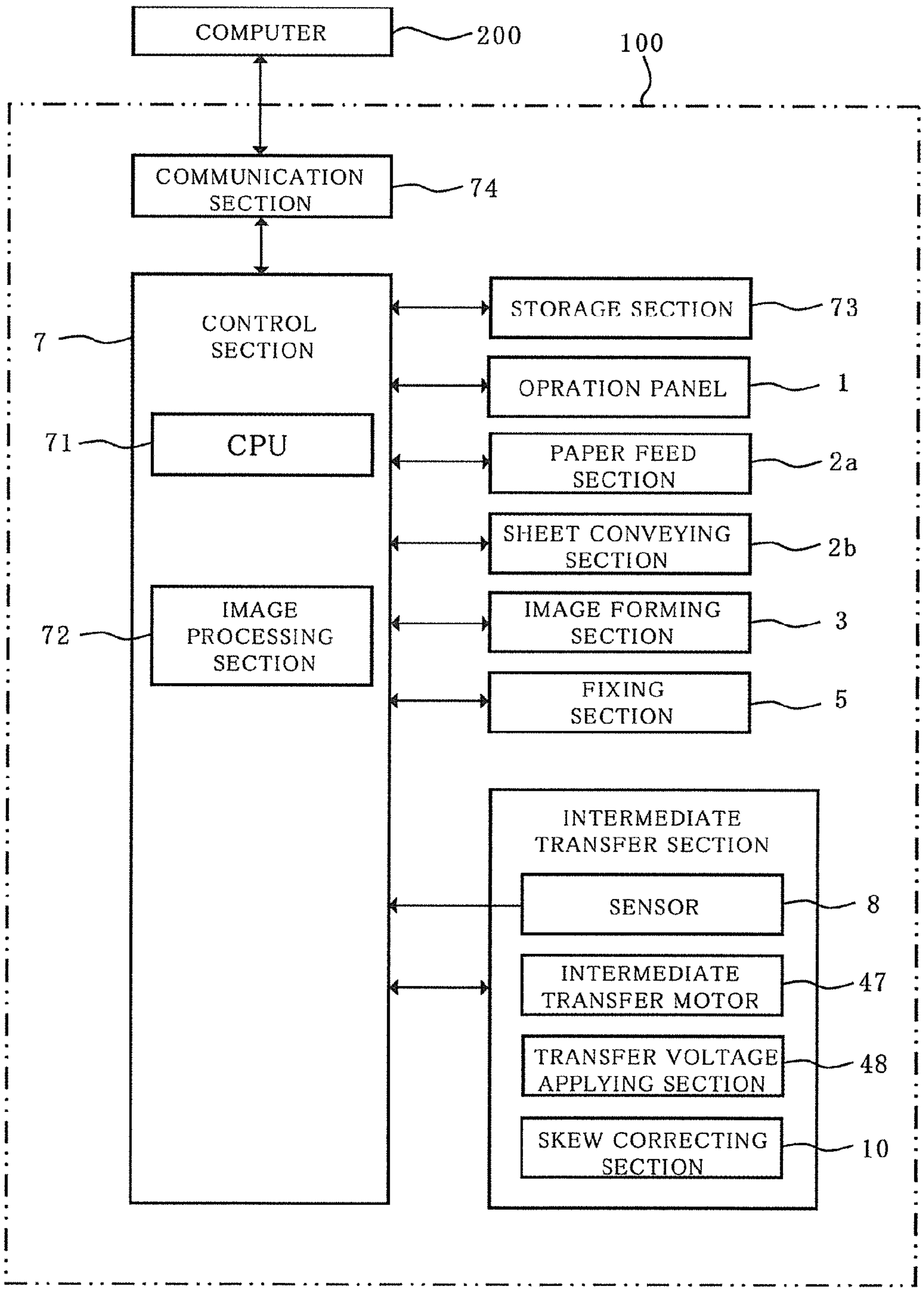
FIG. 3 is a block diagram that illustrates the hardware configuration of the printer.

The hardware configuration of the printer 100 according to the embodiment is described next with reference to FIG. 3. FIG. 3 is a block diagram that illustrates the hardware configuration of the printer 100.

As illustrated in FIG. 3, the printer 100 includes a control section 7 (corresponding to a determining section) therein. The control section 7 controls each section of the printer 100. The control section 7 includes a central processing unit (CPU) 71 and an image processing section 72. The control section 7 may be made up of a plurality of sections separated according to functions, including a main control section that controls the overall processing, communications, and image processing and an engine control section that controls printing by turning on or off the motor for use in forming images and for rotating various rotators. In the present description, the form in which these control sections are integrated is illustrated and described.

The control section 7 is connected to a storage section 73. Within the storage section 73, nonvolatile and volatile storage devices, including a read-only memory (ROM), a random-access memory (RAM), a flash ROM, and a hard disk drive (HDD), are contained. The storage section 73 stores a control program and control data for the printer 100. The CPU 71 is a central processing unit that controls each section of the printer 100 and performs calculations on the basis of the control program and the setting data stored in the storage section 73.

The control section 7 is connected to a communication section 74. The communication section 74 is an interface for communication with a computer 200 (e.g., personal computer or server) over a network or cable. The computer 200 is a source that transmits print data including image data to be printed and setting data for printing. The printer 100 performs printing on the basis of the image data and setting data input into the communication section 74 from the computer 200.

The image processing section 72 performs various kinds of image processing, such as enlargement, reduction, density conversion, or data format conversion, on image data received from the computer 200 in accordance with the setting data. The image processing section 72 sends the image data subjected to the image processing to the exposure device 31. The exposure device 31 receives the image data, scans and exposes the photosensitive drum 32, and forms an electrostatic latent image on the photosensitive drum 32.

The control section 7 is connected to the operation panel 1, paper feed section 2*a*, sheet conveying section 2*b*, image forming section 3, and fixing section 5. The control section 7 controls the operation of each section on the basis of the control program and data stored in the storage section 73 so as to make proper image formation.

Further, the control section 7 is connected to the intermediate transfer section 4 and controls the operation of the intermediate transfer section 4. The control section 7 controls the rotation of the intermediate transfer belt 6 by controlling the on and off and the rotation speed of the intermediate transfer motor 47 for rotating the driving roller 41. The control section 7 provides a transfer voltage applying section 48 with an instruction to apply a voltage for use in a transfer to the primary transfer rollers 40Bk to 40M and the secondary transfer roller 45 and causes the transfer voltage applying section 48 to apply the voltage to any of the transfer rollers as needed.

The control section 7 receives an output value (voltage or current) of a sensor 8 (corresponding to a detector) for detecting the skew of the intermediate transfer belt 6 and the position of the intermediate transfer belt 6 in its circumferential direction. The control section 7 determines the position of the edge of the intermediate transfer belt 6 on the basis of the output value of the sensor 8. The control section 7 determines the arrival of an index 9 (see, for example, FIG. 5) attached to the intermediate transfer belt 6 at the sensor 8 and a passage thereof through the sensor 8 on the basis of the amount of change in the output value of the sensor 8 (details are described below). Accordingly, the control section 7 functions as a determining section that determines the position of the intermediate transfer belt 6 and the arrival and passage of the index 9.

The intermediate transfer section 4 includes a skew correcting section 10 that corrects the skew of the intermediate transfer belt 6. The control section 7 makes the skew correcting section 10 correct the skew of the intermediate transfer belt 6 on the basis of a deviation between the determined position of the edge of the intermediate transfer belt 6 and a predetermined position (ideal position) in the axial direction of each roller. The axial direction is the direction perpendicular to the rotational direction of the intermediate transfer belt 6 (details are described below).

Overview of Skew Correcting Section 10

Figure 4:
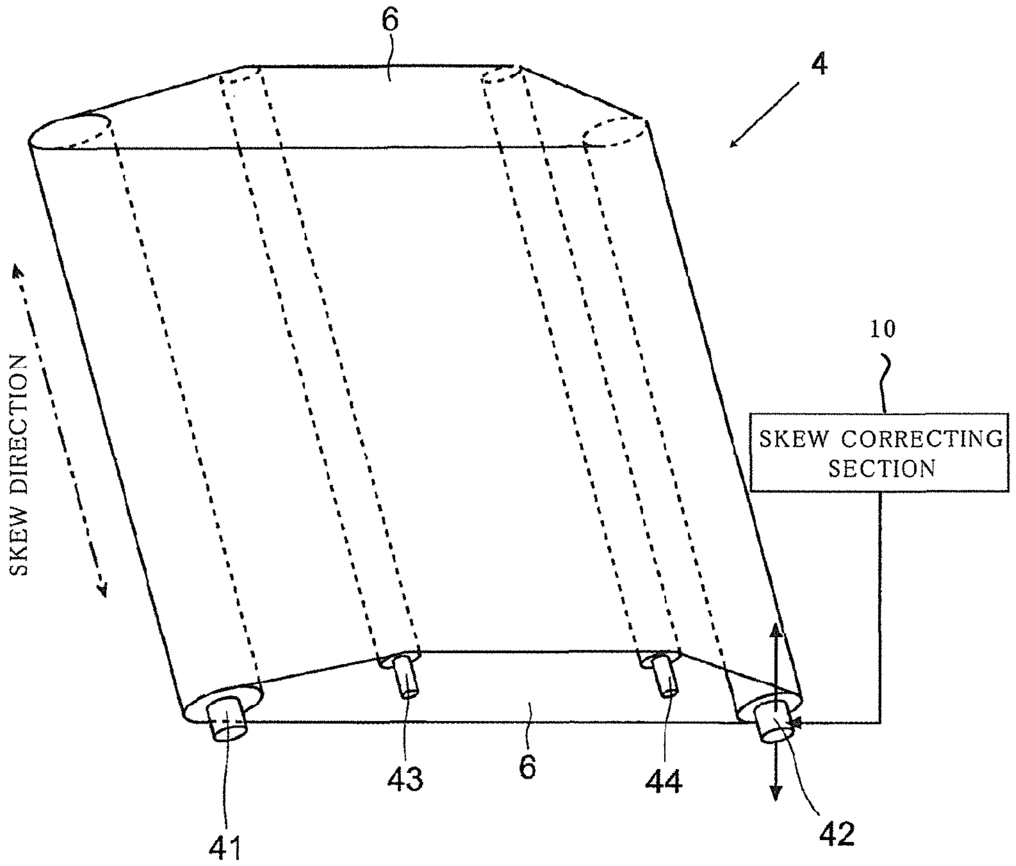
FIG. 4 is an illustration of the control relating to skew correction.

The overview of control relating to skew correction (skew feedback control) according to the present embodiment is provided below with reference to FIG. 4. FIG. 4 is an illustration of the control relating to skew correction according to the present embodiment.

FIG. 4 illustrates the intermediate transfer belt 6, the members around which the intermediate transfer belt 6 is stretched (driving roller 41, driven roller 42, and tension rollers 43 and 44), and skew correcting section 10 in the intermediate transfer section 4. The intermediate transfer belt 6 may skew due to factors such as the manufacturing accuracy (deviation from a perfect cylindrical shape) of each roller, the attaching accuracy (difficulty of having exact parallelism of the axes of the rollers), non-uniformity of the thickness of the intermediate transfer belt 6, or non-uniformity of the tension of the intermediate transfer belt 6.

If the intermediate transfer belt 6 skews, as indicated by the two-dot chain line in FIG. 4, the intermediate transfer belt 6 deviates from a reference position (ideal position in specification) in the width direction of the belt (the axial direction of each roller; the direction perpendicular to the rotational direction of the intermediate transfer belt 6). If this deviation is large and the skew is large, the intermediate transfer belt 6 may be worn. To address this issue, the printer 100 according to the present embodiment includes the skew correcting section 10.

The skew correcting section 10 corrects the intermediate transfer belt 6 so as to reduce the deviation of the position of the intermediate transfer belt 6 from the reference position. Specifically, the skew correcting section 10 is a mechanism that displaces the axial direction of the driven roller 42 to correct the skew. As illustrated in FIG. 4, the skew correcting section 10 raises or lowers an end of the driven roller 42. In other words, the skew correcting section 10 inclines the axial direction of the driven roller 42 in the vertical direction with respect to the axial direction of each of the other rollers in the intermediate transfer section 4, such as the driving roller 41. This produces a warp (twist) in the intermediate transfer belt 6 and generates a force for moving the intermediate transfer belt 6 in an intended direction. As a result, the intermediate transfer belt 6 returns to the reference position.

The skew correcting section 10 includes a mechanism and driving source for inclining the driven roller 42. The skew correcting section 10 includes a motor as the driving source. Changing the direction in which the motor is rotated enables an end of the driven roller 42 to be raised or lowered to incline the driven roller 42. The state in which the axial direction of the driven roller 42 and that of each of the other rollers are parallel is used as the reference. Changing the amount of rotation of the motor from the reference enables the magnitude of the inclination of the driven roller 42 to be controlled. If a sharp skew occurs, the skew correcting section 10 inclines the driven roller 42 to the maximum angle to which it can be inclined to return the intermediate transfer belt 6 to the reference position. Any mechanism that can incline the driven roller 42 may be used in the skew correcting section 10. For example, a solenoid may be used in the skew correcting section 10 to incline the axis of the driven roller 42 in accordance with a deviation of the intermediate transfer belt 6.

Determination of Position of Edge of Belt and Skew Correction

Figure 5:
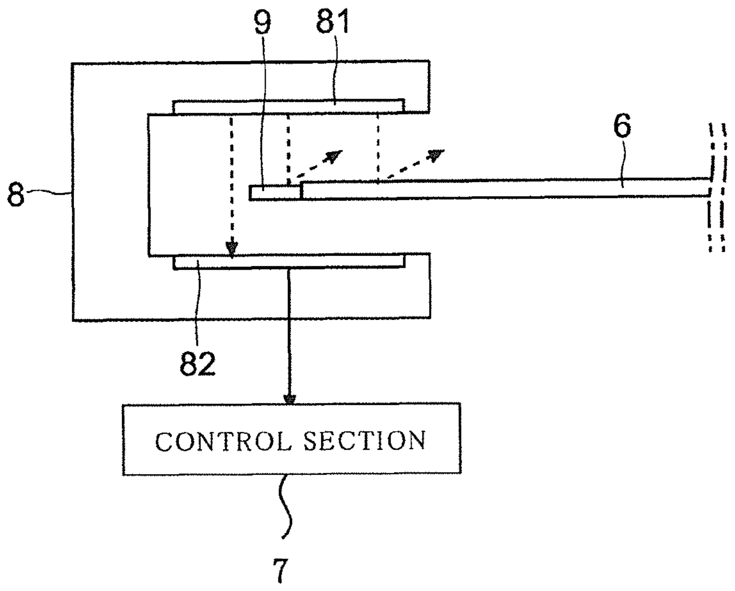
FIG. 5 is an illustration of a sensor.
Figure 6:
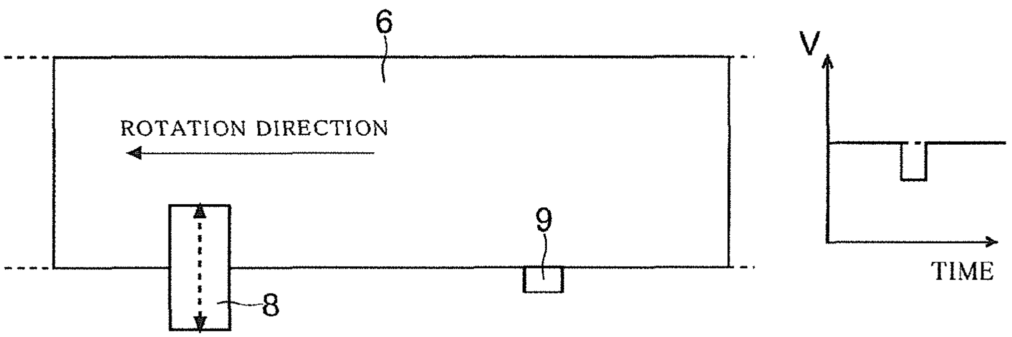
FIG. 6 is an illustration of a state where an intermediate transfer belt does not skew and the corresponding output of the sensor in that state.
Figure 7:
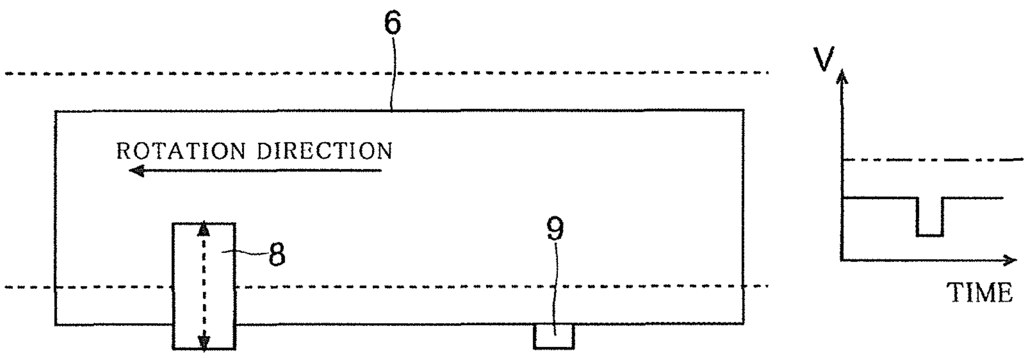
FIG. 7 is an illustration of a state where the position of the intermediate transfer belt deviates from a reference position and the corresponding output of the sensor in that state.
Figure 8:
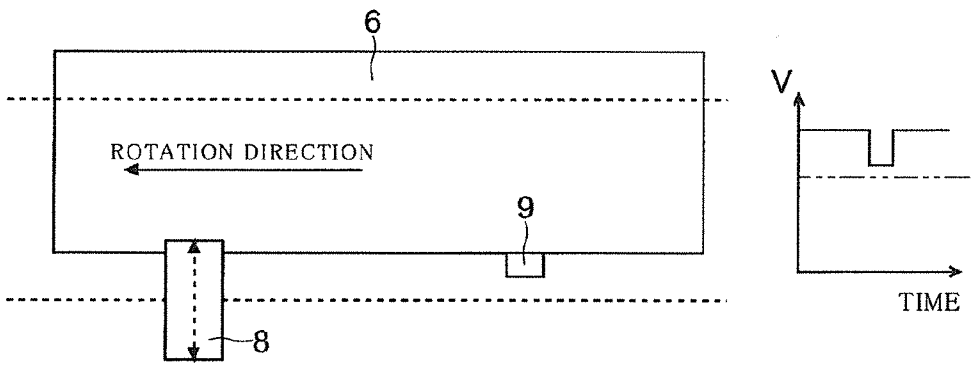
FIG. 8 is an illustration of another state where the intermediate transfer belt deviates from the reference position and the corresponding output of the sensor in that state.
Figure 9:
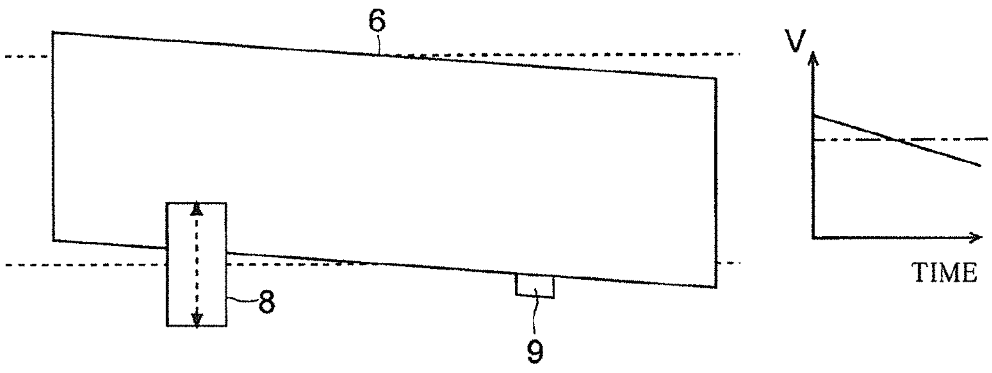
FIG. 9 is an illustration of a change in the output value of the sensor when the intermediate transfer belt skews and the corresponding output of the sensor in that state.

An example of the determination of the position of the edge of the intermediate transfer belt 6 in the printer 100 according to the present embodiment is described next with reference to FIGS. 5 to 9. FIG. 5 is an illustration of the sensor 8. FIG. 6 is an illustration of a state where the intermediate transfer belt 6 does not skew and the corresponding output value of the sensor 8 in that state. FIGS. 7 and 8 are illustrations of states where the position of the intermediate transfer belt 6 deviates from the reference position and the corresponding output values of the sensor 8 in these states. FIG. 9 is an illustration of a change in the output value of the sensor 8 when the intermediate transfer belt 6 skews and the corresponding output value of the sensor in that state.

As illustrated in FIGS. 5 to 9, the printer 100 according to the present embodiment includes the sensor 8 to detect the position of the edge of the intermediate transfer belt 6 and the index 9 on the edge of the intermediate transfer belt 6.

As illustrated in FIG. 5, the sensor 8 has a U shape in cross section and includes a light emitting section 81 (one or more light-emitting diodes (LEDs)) in the upper portion of the inner surface of the sensor 8 and a light receiving section 82 (light-receiving optical sensor) in the lower portion of the inner surface. The light receiving section 82 includes a plurality of light receiving elements. Alternatively, the position of the light emitting section 81 and that of the light receiving section 82 may be interchanged with each other. The light emitting section 81 emits light toward the light receiving section 82 (the light is indicated by the broken lines in FIG. 5). The output value (output voltage value) of the light receiving section 82 changes in accordance with the magnitude of the level of received light (amount of received light).

The edge of the intermediate transfer belt 6 passes through (so as to be inserted into) the gap between the light emitting section 81 and the light receiving section 82 in the sensor 8. The edge of the intermediate transfer belt 6 is provided with the index 9 as a projection. The index 9 is disposed so that the position of the intermediate transfer belt 6 in its circumferential direction is detected. In this way, the index 9 also passes through the gap between the light emitting section 81 and the light receiving section 82 in the sensor 8 (the detection region of the sensor 8). In other words, the sensor 8 is arranged such that the edge of the intermediate transfer belt 6 and the index 9 can pass through the detection region.

As illustrated in FIG. 5, because the light emitting section 81 and the light receiving section 82 in the sensor 8 are disposed to sandwich the edge of the intermediate transfer belt 6 and the index 9, the output value (output voltage value) of the light receiving section 82 changes depending on the position of the edge of the intermediate transfer belt 6. For example, the amount of light that can be received by the light receiving section 82 increases with a reduction in the distance between the position of the edge of the intermediate transfer belt 6 and the opening portion of the U shape of the sensor 8, and as a result, the output value of the light receiving section 82 increases. In contrast, the amount of light that can be received by the light receiving section 82 decreases with an increase in the distance between the position of the edge of the intermediate transfer belt 6 and the opening portion of the U shape of the sensor 8, and as a result, the output value of the light receiving section 82 decreases. Because the index 9 projects toward the bottom of the U shape of the sensor 8, when the index 9 passes through the detection region of the sensor 8, the amount of light that can be received by the light receiving section 82 decreases, and as a result, the output value of the light receiving section 82 decreases.

The output value of the light receiving section 82 in the sensor 8 is input into the control section 7 (see FIG. 3). The control section 7 can determine the position of the edge of the intermediate transfer belt 6 in the axial direction of the rollers on the basis of the output value of the light receiving section 82 (details are described below). When the index 9 arrives at the detection region of the sensor 8, the level of the output value of the light receiving section 82 decreases in stages. When the index 9 has passed through the detection region of the sensor 8, the level of the output value of the light receiving section 82 increases in stages. The control section 7 can determine the arrival or passage of the index 9 (the state in which the index 9 passes through the detection region of the sensor 8) from the change in the output value of the light receiving section 82 (details are described below).

In this way, according to the present embodiment, the control section 7 can detect the position of the edge of the intermediate transfer belt 6 and the arrival and passage of the index 9 by the use of the single sensor 8.

Changes in output of the sensor 8 caused by the position of the edge of the intermediate transfer belt 6 and the passage of the index 9 are described next with reference to FIGS. 6 to 9. In FIGS. 6 to 9, the sensor 8 is positioned in the vicinity of the bottom portion of the intermediate transfer belt 6 in the drawings, and the index 9 is disposed on the bottom of the intermediate transfer belt 6 in the drawings.

In FIGS. 6 to 9, the predetermined reference position (ideal position; position at which no skew occurs) of the intermediate transfer belt 6 is indicated by the broken lines. In FIG. 6, where the intermediate transfer belt 6 does not deviate from the reference position, the state in which the edge of the intermediate transfer belt 6 and the broken lines (reference position) overlap each other is illustrated.

A graph that illustrates one example of the relationship between the output value of the sensor 8 and time in this situation is provided in the right side of FIG. 6. The X axis in this graph represents the time, and the Y axis represents the magnitude of the output voltage of the sensor 8. The same applies to FIGS. 7 to 9 described below. The sensor 8 is disposed such that the output value of the sensor 8 is the median in the output width of the sensor 8 when the intermediate transfer belt 6 is in the reference position in the axial direction of each roller.

The output value of the sensor 8 when the position of the edge of the intermediate transfer belt 6 deviates in the direction toward the sensor 8 (direction of the front of the printer 100) with respect to the reference position is described next with reference to FIG. 7. When the edge of the intermediate transfer belt 6 moves in the direction toward the sensor 8 due to its skew or other reasons, the amount of light blocked by the intermediate transfer belt 6 in the detection region of the sensor 8 (between the light emitting section 81 and the light receiving section 82) is larger than that when the intermediate transfer belt is in the reference position.

A graph that illustrates one example of the relationship between the output voltage value of the sensor 8 and time in this situation is illustrated in the right side of FIG. 7. As illustrated in FIG. 7, when the edge of the intermediate transfer belt 6 deviates in the direction toward the sensor 8 with respect to the reference position, the output value of the sensor 8 is smaller than that when the intermediate transfer belt is in the reference position. In FIG. 7, the output value of the sensor 8 when the intermediate transfer belt 6 is in the reference position is indicated by the two-dot chain line.

The output value of the sensor 8 when the position of the edge of the intermediate transfer belt 6 deviates in a direction away from the sensor 8 (direction of the back of the printer 100) with respect to the reference position is described next with reference to FIG. 8. When the edge of the intermediate transfer belt 6 moves from the reference position in the direction away from the sensor 8, the amount of light blocked by the intermediate transfer belt 6 in the detection region of the sensor 8 is smaller than that when the intermediate transfer belt 6 is in the reference position.

A graph that illustrates one example of the relationship between the output voltage value of the sensor 8 and time in this situation is illustrated in the right side of FIG. 8. When the edge of the intermediate transfer belt 6 deviates in the direction away from the sensor 8 with respect to the reference position, the output value of the sensor 8 is larger than that when the intermediate transfer belt is in the reference position. Also in FIG. 8, the output value of the sensor 8 when the intermediate transfer belt 6 is in the reference position is indicated by the two-dot chain line.

The output value of the sensor 8 when the intermediate transfer belt 6 is skewing is described next with reference to FIG. 9. During skewing, the position of the edge of the intermediate transfer belt 6 passing through the detection region of the sensor 8 changes in the axial direction of each roller. Hence, the amount of light blocked by the intermediate transfer belt 6 between the light emitting section 81 and the light receiving section 82 in the sensor 8 changes. Thus, as illustrated in FIG. 9, when the intermediate transfer belt 6 moves in the axial direction of each roller due to its skew, the output value of the sensor 8 gradually changes.

As described above, the position of the edge of the intermediate transfer belt 6 and the output voltage value of the sensor 8 are correlated with each other. Hence, the control section 7 receives the output value of the sensor 8 and determines the magnitude thereof.

The control section 7 determines (measures) the output value of the sensor 8 at predetermined intervals. For example, the CPU 71 in the control section 7 converts the output voltage value of the sensor 8 from analog to digital and determines the output value of the sensor 8 (alternatively, a separate A/D converter may be provided). The storage section 73 stores in advance position-detecting data specifying the position of the edge of the intermediate transfer belt 6 corresponding to each of the output values of the sensor 8. The control section 7 can determine the position of the edge of the intermediate transfer belt 6 by referring to the output voltage value of the sensor 8 and the position-detecting data.

The control section 7 measures the output voltage value of the sensor 8 periodically (e.g., every several tens of milliseconds). The control section 7 determines the position of the edge of the intermediate transfer belt 6, the amount of deviation, and the direction of deviation for each measurement and specifies the operation of the skew correcting section 10. In this way, the control section 7 periodically measures the output voltage value of the sensor 8 and provides the skew correcting section 10 with instructions for operation at short intervals to cause the skew correcting section 10 to make skew correction for each measurement time. In other words, the control section 7 performs skew feedback control on the basis of the output of the sensor 8.

The control section 7 can determine the amount of deviation and the direction of deviation of the intermediate transfer belt 6 from the reference position on the basis of the position of the edge of the intermediate transfer belt 6. The storage section 73 stores in advance data specifying the amount of deviation and the direction of deviation of the intermediate transfer belt 6 corresponding to each of the determined positions of the edge of the intermediate transfer belt 6. The storage section also stores deviation-amount detecting data specifying the amount of deviation and the direction of deviation of the intermediate transfer belt 6 corresponding to each of the output values of the sensor 8 (data on the amount of deviation zero indicates the reference position). The control section 7 can determine the amount of deviation and the direction of deviation of the intermediate transfer belt 6 by referring to the deviation-amount detecting data.

Depending on the direction of correction (direction of movement) of the position of the intermediate transfer belt 6 to return the intermediate transfer belt 6 to the reference position, the direction of inclination of the driven roller 42 differs. Depending on the degree of inclination of the driven roller 42, the force for returning the intermediate transfer belt 6 to the reference position also differs. Accordingly, depending on the amount of deviation of the intermediate transfer belt 6, the angle to which the driven roller 42 is to be inclined and the time for which the driven roller 42 is to be inclined also differ. Thus, in accordance with the amount of deviation and the direction of deviation of the intermediate transfer belt 6, skew correction data that specifies the direction of inclination of the driven roller 42, the angle of the inclination, and the time for which the driven roller 42 is inclined is stored in advance in the storage section 73. The control section 7 specifies the operation of the skew correcting section 10 using the skew correction data and causes the skew correcting section 10 to operate.

An example of detection of the index 9 is described next with reference to FIGS. 6 to 9.

As illustrated in FIGS. 6 to 9, the printer 100 according to the present embodiment includes the index 9 projecting from the edge of the intermediate transfer belt 6 for detecting the position of the intermediate transfer belt 6 in the circumferential direction (specific position of the intermediate transfer belt 6 in its circumferential direction). The index 9 is used for determining the position where a toner image is to be formed (timing when a toner image is to be formed) and the timing when patch images for calibration of the image density of a formed image are to be formed. The index 9 is also used for calculating the time required for one rotation of the intermediate transfer belt 6 and the circumferential velocity of the intermediate transfer belt 6 (perimeter of the intermediate transfer belt 6 is predetermined).

The index 9 is disposed so as to project from the edge of the intermediate transfer belt 6 adjacent to the sensor 8. The index 9 passes through the detection region of the sensor 8 (the gap between the light emitting section 81 and light receiving section 82 in the inner surface of the sensor 8).

As described above, the sensor 8 according to the present embodiment changes its output value in accordance with the amount of light received by the light receiving section 82. Thus, as illustrated in FIGS. 5 to 8, when the index 9 arrives at the detection region of the sensor 8 (is passing through the detection region), the output value of (the light receiving section 82 of) the sensor 8 is smaller than that when the edge of the intermediate transfer belt 6 passes thorough the detection region of the sensor. Once the index 9 has passed through the detection region, the output value of (the light receiving section 82 of) the sensor 8 recovers (increases).

In this way, the amount of light blocked by the intermediate transfer belt 6 in the sensor 8 is changed by the arrival and passage of the index 9. Thus, the arrival and passage of the index 9 causes the output value of the sensor 8 to decrease and then increase.

The control section 7 periodically measures the output of the sensor 8. The size of the index 9 is fixed as is the amount of light blocked when the index 9 passes through the sensor 8. Thus, the amount of change in the output value of the sensor 8 caused by the arrival and passage of the index 9 is also fixed to some extent. To set the threshold of detection of the index, the storage section 73 stores the amount of change in the output value of the sensor 8 caused by the arrival or passage of the index 9 as the amount of change resulting from the index 9.

When the index 9 passes through the sensor 8, the output value does not always change by the amount of change resulting from the index 9, and there is a certain error. Thus, a threshold that is smaller than the amount of change resulting from the index is set. The control section 7 recognizes that the index 9 has arrived at or passed through the detection region of the sensor 8 when the absolute value of the difference between a measured output value of the sensor 8 at the present measurement time and an output value at the immediately preceding measurement time, that is, the difference between the output values at successive two measurement times has exceeded the threshold.

The control section 7 compares the output value of the sensor 8 at the present measurement with the output value of the sensor 8 at the preceding measurement. When there is a difference between the output values, even if the difference does not exceed the threshold, the control section 7 determines that the intermediate transfer belt 6 has moved in the axial direction of each roller because of skewing. The faster the moving speed of the intermediate transfer belt 6 in the axial direction of each roller is, the bigger the absolute value of the difference between the output values is.

Detecting Index while Performing Control Relating to Skew Correction

Figure 10:
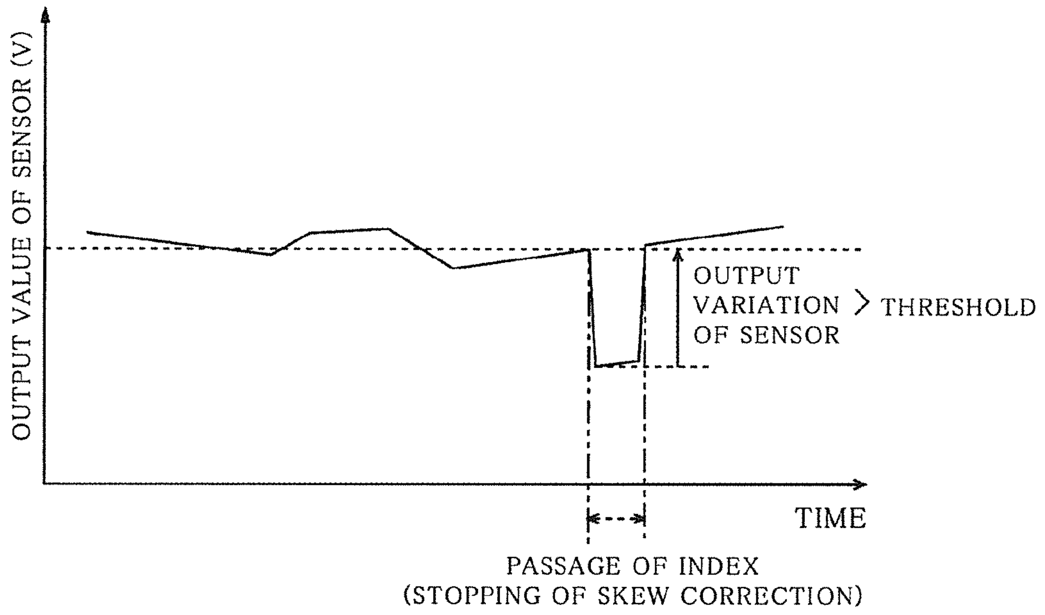
FIG. 10 is a graph illustrating a variation in the output value of the sensor over time.

Detection of an index while the printer 100 according to the present embodiment performs control relating to skew correction (skew feedback control) is described next with reference to FIG. 10. FIG. 10 is a graph illustrating a variation in the output value of the sensor 8 over time.

The horizontal axis in FIG. 10 represents the passage of time. The vertical axis in FIG. 10 represents the magnitude of the output value of the sensor 8. The broken line in FIG. 10 represents the output value of the sensor 8 when the intermediate transfer belt 6 is in the reference position.

The control section 7 determines the output value of the sensor 8 periodically, for example, at the time of execution of printing. The control section 7 controls the skew correcting section 10 to perform skew feedback control such that the position of the intermediate transfer belt 6 in the axial direction of each roller stays in the reference position based upon the output value of the sensor 8 at each measurement time.

This skew feedback control enables the output value of the sensor 8 to remain on average at the output value at which the intermediate transfer belt 6 is in the reference position. In the printer 100 according to the present embodiment, the intermediate transfer belt 6 is provided with the index 9.

When feedback control based on a change in the output value of the sensor 8 caused by the arrival or passage of the index 9 is performed, incorrect skew feedback control results due to the position of the end of the index 9 being identified as the position of the edge of the intermediate transfer belt 6. Thus, the intermediate transfer belt 6 may further skew.

In the present embodiment, when a change in the output value of the sensor 8 has exceeded the threshold, the control section 7 determines the arrival or passage of the index 9 and stops the correction by the skew correcting section 10. Because the circumferential velocity of the intermediate transfer belt 6 and the length of the index 9 in the circumferential direction are predetermined, the time required for the index 9 to pass through the detection region of the sensor 8 is substantially fixed. The control section 7 may stop the correction by the skew correcting section 10 for the fixed time equaling the time required for the index 9 to pass through the detection region of the sensor 8 from the arrival of the index 9.

Setting Threshold of Detection of Index

Figure 11:
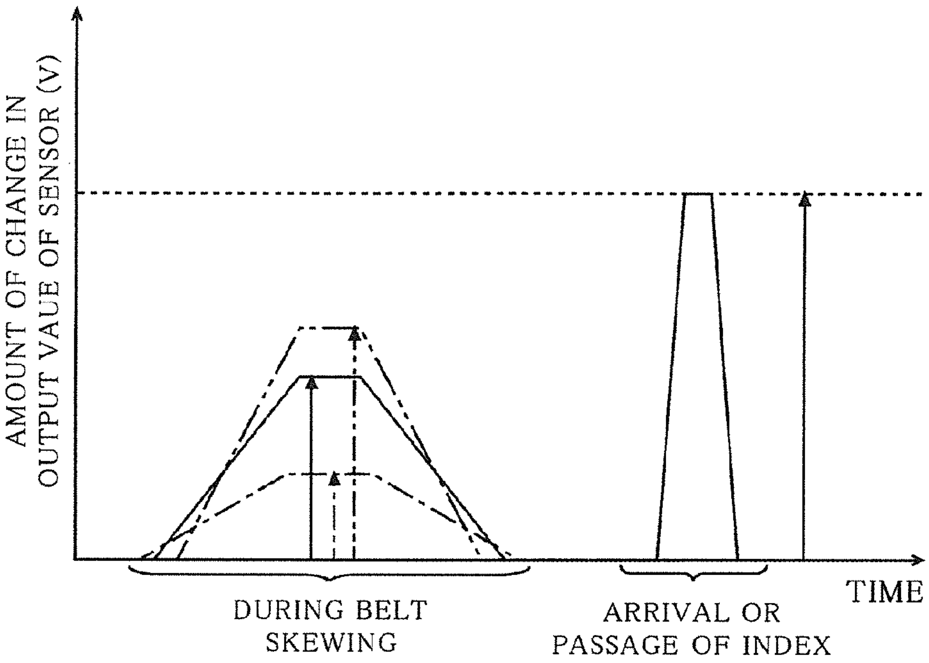
FIG. 11 is an illustration of setting a threshold of detection of an index.
Figure 12:
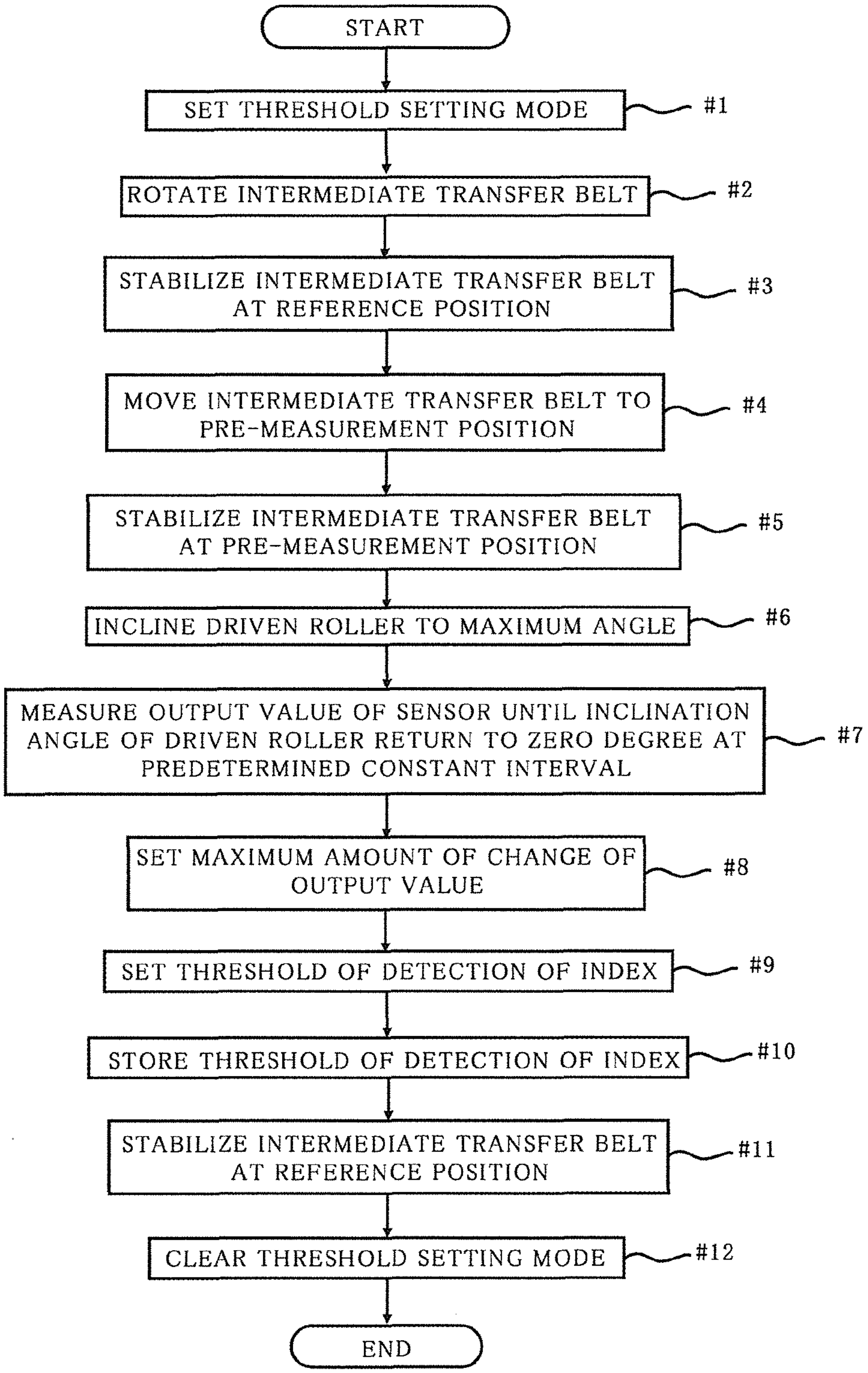
FIG. 12 is a flowchart of the method for setting the threshold of detection of the index.

Setting the threshold of detection of the index is described next with reference to FIGS. 11 and 12. FIG. 11 is an illustration of the setting of the threshold of detection of the index. FIG. 12 is a flowchart of the method for setting the threshold of detection of the index.

The printer 100 according to the present embodiment detects the index 9 and the position of the edge of the intermediate transfer belt 6 on the basis of the output value of the single sensor (sensor 8). The control section 7 obtains the magnitude of the output value of the sensor 8 at constant measurement intervals. The control section 7 determines the arrival and passage of the index 9, depending on whether the amount of change in the output value of the sensor 8 (absolute value of the difference between the output values at neighboring measurement times) exceeds the threshold. In other words, the control section 7 determines the arrival and passage of the index 9 based on the amount of change in the output value of the sensor 8 per unit time (period when measurement is conducted).

The output value of the sensor 8 changes even when the intermediate transfer belt 6 skews and moves in the axial direction of each roller. Depending on individual image forming apparatuses, the assembly accuracy, variations in the thickness of the intermediate transfer belt 6, and other elements differ. In view of these differences, the degree of the skewing tendency of the intermediate transfer belt 6 (moving speed in the axial direction of each roller) varies from one image forming apparatus to another.

Accordingly, if the threshold is set uniformly (at the same value for all image forming apparatuses), a change in the output value caused by skewing of the intermediate transfer belt 6 may be incorrectly detected as an arrival or a passage of the index 9. To address this issue, in the printer 100 according to the present embodiment, the threshold of detection of the index is set properly for each individual image forming apparatus. The method for setting the threshold of detection of the index is described below with reference to FIG. 12.

First, the start in FIG. 12 is the time when the mode for setting the threshold of detection of the index (hereinafter referred to as "threshold setting mode") is selected at the operation panel 1. In this way, for the printer 100 according to the present embodiment, the threshold of detection of the index can be set by an input at the operation panel 1 for each image forming apparatus. With this, the threshold of detection of the index can be set at any time, such as in a production line, at the time of maintenance, at the time of placement, or at the time of replacement of a member of the intermediate transfer section 4.

When the operation panel 1 accepts an input that instructs setting of the threshold of detection of the index (an instruction to perform the threshold setting operation), the control section 7 sets the mode of the printer 100 at the threshold setting mode (step #1). In this mode, only the threshold setting operation is performed, and even if image data is transmitted from the computer 200, the control section 7 does not print the image data.

Next, the control section 7 drives the intermediate transfer motor 47 and rotates the intermediate transfer belt 6 at a predetermined speed (step #2). The control section 7 controls the skew correcting section 10 to match the position of the intermediate transfer belt 6 in the axial direction of each roller with the reference position, and to stabilize the position of the intermediate transfer belt 6 while checking the output value of the sensor 8 (step #3). At this time, the control section 7 performs skew feedback control so as to stabilize the output value of the sensor 8 at the output value corresponding to the reference position stored in the storage section 73.

Subsequently, the control section 7 controls the skew correcting section 10 to incline the driven roller 42 for moving the intermediate transfer belt 6 toward a position away from the reference position by a predetermined amount on one side in the axial direction of each roller (hereinafter referred to as "pre-measurement position") (step #4). Data indicating the output value of the sensor 8 when the intermediate transfer belt 6 is at the pre-measurement position is stored in advance in the storage section 73. The control section 7 inclines the driven roller 42 such that the output value of the sensor 8 is equal to that when the intermediate transfer belt 6 is at the pre-measurement position. The pre-measurement position is set at a position where the intermediate transfer belt 6 is not broken by contact with another member inside the printer 100 or for other reasons.

The control section 7 stabilizes the position of the intermediate transfer belt 6 at the pre-measurement position (step #5). At this time, the control section 7 performs skew feedback control such that the output value of the sensor 8 is stabilized at the output value corresponding to the pre-measurement position.

Subsequently, the control section 7 causes the skew correcting section 10 to incline the driven roller 42 to the maximum angle to which the driven roller 42 can be inclined such that the intermediate transfer belt 6 is moved in the axial direction of each roller toward a direction opposite to the direction in which the intermediate transfer belt 6 is moved from the reference position to the pre-measurement position (step #6). This deliberately makes the intermediate transfer belt 6 move at the highest speed in the axial direction of each roller.

FIG. 11 illustrates one example of a change in the output value of the sensor 8 when the skew correcting section 10 is caused to incline the driven roller 42 to the maximum angle to which the driven roller 42 can be inclined and to make the intermediate transfer belt 6 skew to the maximum. FIG. 11 further illustrates one example of a change in the output value at a period of measurement. FIG. 11 also illustrates an example of an individual difference of the speed at which the intermediate transfer belt 6 moves when the intermediate transfer belt 6 is caused to skew to the maximum. Specifically, the two-dot chain line, solid line, and long dashed short dashed line each represent the amount of change in the output value of the sensor 8 in accordance with differences among the speeds at which the intermediate transfer belt 6 moves. In FIG. 11, the speed at which the intermediate transfer belt 6 moves is higher (the amount of change, that is, the absolute value of the difference between the output values at successive two times is higher) in the order of the long dashed short dashed line, solid line, and two-dot chain line.

As described above, when the intermediate transfer belt 6 skews, the change in the output value differs for each individual image forming apparatus. Accordingly, if the threshold of detection of the index is uniformly set, the arrival or passage of the index 9 may be incorrectly detected.

Thus, the control section 7 returns the angle of the inclination of the driven roller 42 to zero degree after a lapse of a predetermined inclination time (the time for which the driven roller 42 is inclined to the maximum angle to which the driven roller 42 can be inclined) measured from the inclination of the driven roller 42 to the maximum angle to which the driven roller 42 can be inclined. The control section further measures the output values of the sensor 8 at predetermined constant interval during that time (step #7). The inclination time is set within the range in which, when the driven roller 42 is inclined to the maximum angle to which the driven roller 42 can be inclined to move the intermediate transfer belt 6 in the axial direction of each roller, the intermediate transfer belt 6 is not broken by contact between the edge of the intermediate transfer belt 6 and a member in the printer 100.

The control section 7 sets the maximum amount of change of the output value of the sensor 8 per unit time (measurement period) on the basis of the measured output values of the sensor 8 at the measurement times (the largest difference among the measured amounts of change, that is, the largest difference among (the absolute values of) the differences between the output values at successive two measurement times) (step #8).

The control section 7 sets the threshold of detection of the index within the range between the measured amount of change (maximum amount of change) and the amount of change resulting from the index (step #9). The control section 7 sets the threshold of detection of the index at a value between the measured amount of change and the amount of change resulting from the index (preferably a substantially intermediate value to avoid incorrect detection). The control section 7 causes the storage section 73 to store the threshold of detection of the index (step #10). The control section 7 detects an arrival and a passage of the index 9 on the basis of the threshold set in this way so as to correspond to an individual apparatus.

The control section 7 returns the position of the intermediate transfer belt 6 in the axial direction of each roller to the reference position and stabilizes the position of the intermediate transfer belt 6 (step #11). At this time, the control section 7 performs skew feedback control such that the output value of the sensor 8 is stabilized at the output value in the reference position (stored in the storage section 73) and returns the position of the intermediate transfer belt 6 in the axial direction of each roller to the reference position. The control section 7 clears the threshold setting mode (step #12) and returns the mode of the printer 100 to the normal mode. In this way, all the steps in the flowchart are completed.

As described above, the image forming apparatus (printer 100) according to the present embodiment includes the endless belt (intermediate transfer belt 6) stretched and rotated around the plurality of rollers (driven roller 42, driving roller 41, tension rollers 43 and 44 and so on), the detector (sensor 8), the determining section (control section 7), the skew correcting section 10, and the storage section 73. The endless belt is provided with the index 9 projecting from its edge. The detector is arranged so as to allow the edge of the belt and the index 9 to pass through its detection region. The output value of the detector varies, depending on the length (the length in the axial direction of each roller) in the detection region covered by the belt and the index 9. The determining section determines the magnitude of the output value of the detector, determines the position of the edge of the belt based on the magnitude of the output value, and determines that the index 9 is passing through the detection region of the detector based on a change in the output value, the change exceeding the predetermined threshold. The skew correcting section performs skew correction by inclining at least one roller (driven roller 42) of the plurality of rollers to correct the position of the belt. The storage section stores the threshold having a value between the measured amount of change, the amount of change in the output value of the detector when the skew correcting section 10 inclines the roller (driven roller 42) to the maximum angle to which the roller can be inclined, and the amount of change resulting from the index, the amount of change in the output value of the detector when the index 9 arrives at the detector or when the index 9 passes through the detector.

With this, a state where the largest skew occurs in the belt (intermediate transfer belt 6) (a state where the moving speed of the belt in the axial direction of each of the driven roller 42, driving roller 41, and tension rollers 43 and 44 is the largest) is virtually created, and the threshold of detection of the index can be set so as to be greater than the measured amount of change measured in that created state. In this manner, the maximum width of change in the output value of the sensor caused by skew of the belt is virtually determined, and the threshold of detection of the index is set so as to be larger than that width of change. Accordingly, a change in the output value of the detector (sensor 8) caused by skew of the belt can be prevented from being incorrectly detected as an arrival or a passage of the index 9. Although the instantaneous maximum amount of the skew of the belt varies from one individual apparatus to another due to factors, such as the assembly accuracy or precision of members of an image forming apparatus, the same threshold is not set, and a proper threshold of detection of the index can be set for each individual image forming apparatus (printer 100).

In setting the threshold, the skew correcting section 10 inclines a roller (driven roller 42, driving roller 41, or tension rollers 43 and 44) to move the belt (intermediate transfer belt 6) on one side in the axial direction of each roller, and move the position of the belt to a pre-measurement position. Next, after the position of the belt is stabilized at the pre-measurement position, the skew correcting section 10 performs a threshold setting operation of inclining the roller to the maximum angle to which the roller can be inclined to move the belt in a direction opposite to the direction in which the belt has been moved. The storage section 73 stores the threshold having a value between the measured amount of change obtained in the threshold setting operation and the amount of change resulting from the index. In this way, the belt is first moved on purpose in a direction opposite to the direction in which the belt is to be moved to set the threshold. Accordingly, the measured amount of change can be obtained before the belt is broken by contact between the edge of the belt and a member in the image forming apparatus (printer 100) or for other reasons.

The storage section 73 stores a substantially intermediate value between the maximum measured amount of change per predetermined unit time in the threshold setting operation and the amount of change resulting from the index as the threshold. This enables the threshold to be set at a proper magnitude and can prevent a change in the output value of the detector caused by skew of the belt (intermediate transfer belt 6) from being incorrectly detected as an arrival or a passage of the index 9. The predetermined unit time can be set at any value. For example, the predetermined unit time may be set at the time required for the index 9 to pass through the detection region of the detector, and the amount of change in the output value of the detector may be compared with the threshold stored in the storage section 73.

The skew correcting section 10 raises or lowers in the axial direction one end of a single roller (e.g., driven roller 42) of the plurality of rollers (driven roller 42, driving roller 41, tension rollers 43 and 44) around which the belt (intermediate transfer belt 6) is stretched. As a result, the roller is inclined to move the position of the belt in the axial direction of the roller. In this way, the skew of the belt can be corrected, and the belt can be made to skew on purpose.

The image forming apparatus (printer 100) includes an operating section (operation panel 1) that accepts an instruction to perform a threshold setting operation. When the instruction to perform the threshold setting operation is provided to the operating section, the skew correcting section 10 performs the threshold setting operation. The storage section 73 stores the threshold set on the basis of the threshold setting operation. In this way, the threshold of detection of the index can be set at any time, such as in a production process (at the time of setting in the line in a factory), at the time of placement of the image forming apparatus, or at the time of replacement of a member, including the belt, for each image forming apparatus such that no incorrect detection occurs.

The present disclosure can also be construed as a disclosure of a method. Specifically, a method of detecting an index for use in the image forming apparatus (printer 100) includes the following steps: rotating the endless belt (intermediate transfer belt 6) stretched around the plurality of rollers (driven roller 42, driving roller 41, tension rollers 43 and 44) and provided with the index 9 projecting from the edge of the belt; determining the magnitude of an output value of the detector (sensor 8) arranged so as to allow the edge of the belt and the index 9 to pass through the detection region, the output value varying depending on the length in the detection region covered by the belt and the index 9; determining the position of the edge of the belt on the basis of the determined magnitude of the output value; determining that the index 9 is passing through the detection region of the detector on the basis of a change in the output value, the change exceeding a predetermined threshold; and performing skew correction of inclining at least one roller (driven roller 42) of the plurality of rollers to correct the position of the belt on the basis of the determined position of the edge of the belt. The threshold is set at a value between the measured amount of change, the amount of change in the output value when the roller (driven roller 42) is inclined at the maximum angle to which the roller can be inclined, and the amount of change resulting from the index, the amount of change in the output value when the index 9 arrives at the detector or passes through the detector (see FIG. 12 and other drawings).

Other embodiments are described next. In the above-described embodiment, the control section 7 is described as a determining section that determines the position of the edge of the intermediate transfer belt 6 and determines an arrival of the index 9 at the sensor 8 and passage thereof. Alternatively, in place of the control section 7, dedicated hardware may be provided as the determining section.

The embodiments of the present disclosure are described above. The scope of the present disclosure is not limited to these embodiments. Embodiments to which various changes are added without departing from the spirit and scope of the disclosure can be made.

What is claimed is:

1. An image forming apparatus comprising:

an endless belt stretched and rotated around a plurality of rollers and provided with an index projecting from an edge of the belt;

a detector configured to be arranged so as to allow the edge of the belt and the index to pass through a detection region of the detector and configured to provide an output value that varies depending on a length of the detection region covered by the belt or the index;

a determining section configured to determine a magnitude of the output value of the detector, to determine a position of the edge of the belt on the basis of the magnitude of the output value, and to determine that the index is passing through the detection region of the detector on the basis of a change in the output value, the change exceeding a predetermined threshold;

a skew correcting section configured to control skew correction by inclining at least one roller of the plurality of rollers to correct a position of the belt on the basis of a determined position of the edge of the belt; and a storage section configured to store the threshold having a value between a measured amount of change and an amount of change resulting from the index, the measured amount of change being a maximum amount of change in the output value when the skew correcting section inclines the roller to a maximum angle to which the roller can be inclined, and the amount of change resulting from the index being an amount of change in the output value when the index arrives at the detector or when the index passes through the detector.

2. The image forming apparatus according to claim 1, wherein, in setting the threshold, the skew correcting section performs a threshold setting operation of inclining the roller, moving the belt towards an axial direction of the roller, moving the position of the belt to a pre-measurement position, stabilizing the position of the belt at the pre-measurement position, and then inclining the roller to the maximum angle to which the roller can be inclined such that the belt is moved in a direction opposite to the direction in which the belt has been moved.

3. The image forming apparatus according to claim 2, wherein the storage section stores the threshold set between the measured maximum amount of change in the threshold setting operation and the amount of change resulting from the index.

4. The image forming apparatus according to claim 3, wherein the storage section stores, as the threshold, a substantially intermediate value between the measured maximum amount of change per predetermined unit time and the amount of change resulting from the index.

5. The image forming apparatus according to claim 2, further comprising an operating section configured to accept an instruction to perform the threshold setting operation.

6. The image forming apparatus according to claim 5, wherein when the instruction to perform the threshold setting operation is provided to the operating section, the skew correcting section performs the threshold setting operation and the storage section stores the threshold set on the basis of the threshold setting operation.

7. The image forming apparatus according to claim 1, wherein the skew correcting section raises or lowers in the axial direction an end of a single roller of the plurality of rollers around which the belt is stretched for inclining the roller, thereby moving the position of the belt in the axial direction of the roller.

8. The image forming apparatus according to claim 7, wherein the skew correcting section includes a driving source for controlling the amount of inclination of the single roller.

9. The image forming apparatus according to claim 1, wherein the skew correcting section generates a force for moving the belt in a direction opposite to the direction in which the belt has moved.

10. The image forming apparatus according to claim 1, wherein the detector region of the detector includes a light emitting section and a light receiving section arranged so as to allow the edge of the belt and the index to pass therebetween.

11. A method of detecting an index for use in an image forming apparatus, the method comprising:

rotating an endless belt stretched around a plurality of rollers and provided with an index projecting from an edge of the belt;

determining a magnitude of an output value of a detector arranged so as to allow the edge of the belt and the index to pass through a detection region of the detector, the output value varying depending on a length of the detection region covered by the belt or the index;

determining a position of the edge of the belt on the basis of the magnitude of the output value;

determining that the index is passing through the detection region of the detector on the basis of a change in the output value, the change exceeding a predetermined threshold; and controlling skew correction by inclining at least one roller of the plurality of rollers to correct the position of the belt on the basis of the determined position of the edge of the belt, the threshold being set at a value between a measured amount of change and an amount of change resulting from the index, the measured amount of change being a maximum amount of change in the output value when the roller is inclined to a maximum angle to which the roller can be inclined, and the amount of change resulting from the index being an amount of change in the output value when the index arrives at the detector or when the index passes through the detector.

12. The method according to claim 11, wherein, in setting the threshold, a skew correcting section performs a threshold setting operation of inclining the roller, moving the belt in an axial direction of the roller, moving the position of the belt to a pre-measurement position, stabilizing the position of the belt at the pre-measurement position, and then inclining the roller to the maximum angle to which the roller can be inclined such that the belt is moved in a direction opposite to the direction in which the belt has been moved.

13. The method according to claim 12, wherein the threshold set between the measured maximum amount of change in the threshold setting operation and the amount of change resulting from the index is stored in a storage section of the image forming apparatus.

14. The method according to claim 12, wherein the storage section stores, as the threshold, a substantially intermediate value between the measured maximum amount of change per predetermined unit time and the amount of change resulting from the index.

15. The method according to claim 12, further comprising an operating section configured to accept an instruction to perform the threshold setting operation.

16. The method according to claim 15 wherein, when the instruction to perform the threshold setting operation is provided to the operating section, the skew correcting section performs the threshold setting operation, and the storage section stores the threshold set on the basis of the threshold setting operation.

17. The method according to claim 12, wherein the skew correcting section raises or lowers in the axial direction an end of a single roller of the plurality of rollers around which the belt is stretched for inclining the roller, thereby moving the position of the belt in the axial direction of the roller.

18. An image forming apparatus comprising:

an endless belt stretched and rotated around a plurality of rollers and provided with an index projecting from an edge of the belt;

a detector configured to be arranged so as to allow the edge of the belt and the index to pass through a detection region of the detector and configured to provide an output value that varies depending upon a position of the edge of the belt or the index within the detector region;

a determining section configured to determine a magnitude of the output value of the detector, a position of the edge of the belt being determined on the basis of the magnitude of the output value, and to determine that the index is passing through the detection region of the detector on the basis of a change in the output value, the change exceeding a predetermined threshold;

a skew correcting section configured to control skew correction by inclining at least one roller of the plurality of rollers to correct a position of the belt on the basis of a determined position of the edge of the belt; and a storage section configured to store the threshold having a value between a measured amount of change and an amount of change resulting from the index.

19. The image forming apparatus according to claim 18, wherein the measured amount of change being a maximum amount of change in the output value when the skew correcting section inclines the roller to a maximum angle to which the roller can be inclined, and the amount of change resulting from the index being an amount of change in the output value when the index arrives at the detector or when the index passes through the detector.

20. The image forming apparatus according to claim 18, wherein the skew correcting section raises or lowers in the axial direction an end of a single roller of the plurality of rollers around which the belt is stretched for inclining the roller, thereby moving the position of the belt in the axial direction of the roller.

* * * * *